(12) United States Patent
Huter et al.

(10) Patent No.: US 11,031,838 B2
(45) Date of Patent: Jun. 8, 2021

(54) HOUSING UNIT FOR AN ELECTRIC MACHINE

(71) Applicant: Siemens Aktiengesellschaft, Munich (DE)

(72) Inventors: Eric Huter, Bad Neustadt a.d. Saale (DE); Reiner Seufert, Salz (DE); Rolf Vollmer, Gersfeld (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 342 days.

(21) Appl. No.: 15/916,018

(22) Filed: Mar. 8, 2018

(65) Prior Publication Data

US 2018/0262078 A1    Sep. 13, 2018

(30) Foreign Application Priority Data

Mar. 9, 2017  (EP) .................................... 17160139

(51) Int. Cl.
| | |
|---|---|
| *H02K 5/20* | (2006.01) |
| *H02K 15/14* | (2006.01) |
| *H02K 5/02* | (2006.01) |
| *H02K 5/04* | (2006.01) |
| *H02K 5/06* | (2006.01) |
| *H02K 7/08* | (2006.01) |
| *H02K 9/00* | (2006.01) |

(Continued)

(52) U.S. Cl.
CPC ................. *H02K 5/20* (2013.01); *H02K 5/02* (2013.01); *H02K 5/04* (2013.01); *H02K 5/06* (2013.01); *H02K 7/083* (2013.01); *H02K 9/005* (2013.01); *H02K 15/14* (2013.01); *H02K 5/15* (2013.01); *H02K 21/14* (2013.01)

(58) Field of Classification Search
CPC .. H02K 5/20; H02K 5/02; H02K 5/04; H02K 5/06; H02K 7/083; H02K 9/005; H02K 15/14; H02K 5/15; H02K 21/14; H02K 15/00
USPC ............................................... 310/89, 91, 64
See application file for complete search history.

(56) References Cited

U.S. PATENT DOCUMENTS 3,571,921 A     3/1971  Pieper
3,777,194 A  *  12/1973 Schaefer ............. H02K 5/1285
                                                              310/87

(Continued)

FOREIGN PATENT DOCUMENTS

CN        86103520 A     1/1987
CN       203691183 U     7/2014

(Continued)

OTHER PUBLICATIONS

Bandar Al-Mangour: „Powder Metallurgy of Stainless Stee/: State-of-The Art, Challenges, and Oevelopment, ISBN: 978-1-63482-080-6, 2015.

*Primary Examiner* — Ahmed Elnakib
(74) *Attorney, Agent, or Firm* — Henry M. Feiereisen LLC

(57) ABSTRACT

A housing includes a first housing unit which includes a first bearing shield, a flange, a stator laminated core arranged between the first bearing shield and the flange, and a coating which is made of stainless steel and applied by an additive manufacturing method so as to cover the first bearing shield, the stator laminated core, and the flange and thereby form a unitary structure.

16 Claims, 2 Drawing Sheets

(51) Int. Cl.
*H02K 5/15* (2006.01)
*H02K 21/14* (2006.01)

(56) References Cited

U.S. PATENT DOCUMENTS

| | | | |
|---|---|---|---|
| 4,281,973 A * | 8/1981 | Meneghello | F04D 29/42 |
| | | | 310/87 |
| 4,532,446 A * | 7/1985 | Yamamoto | H02K 5/1285 |
| | | | 220/612 |
| 4,636,673 A | 1/1987 | McDonald | |
| 5,113,103 A * | 5/1992 | Blum | H02K 5/04 |
| | | | 310/89 |
| 5,859,482 A * | 1/1999 | Crowell | H02K 5/20 |
| | | | 310/54 |
| 6,028,378 A * | 2/2000 | Lack | H02K 1/17 |
| | | | 310/154.01 |
| 6,483,221 B1 | 11/2002 | Pawellek et al. | |
| 6,628,031 B2 | 9/2003 | Vollmer | |
| 6,768,238 B2 | 7/2004 | Knauff et al. | |
| 6,812,612 B2 | 11/2004 | Schunk et al. | |
| 6,858,965 B2 | 2/2005 | Mueller et al. | |
| 6,885,187 B2 | 4/2005 | Duenisch et al. | |
| 6,943,467 B2 | 9/2005 | Potoradi et al. | |
| 7,141,905 B2 | 11/2006 | Vollmer | |
| 7,285,883 B2 | 10/2007 | Bott et al. | |
| 7,501,728 B2 | 3/2009 | Knauff et al. | |
| 7,564,158 B2 | 7/2009 | Huth et al. | |
| 7,692,356 B2 | 4/2010 | Bott et al. | |
| 7,705,507 B2 | 4/2010 | Vollmer | |
| 7,709,984 B2 | 5/2010 | Braun et al. | |
| 7,732,967 B2 | 6/2010 | Vollmer et al. | |
| 7,732,970 B2 * | 6/2010 | Buttner | H02K 1/22 |
| | | | 310/216.004 |
| 7,755,315 B2 | 7/2010 | Bott et al. | |
| 7,777,373 B2 | 8/2010 | Bott et al. | |
| 7,859,160 B2 | 12/2010 | Vollmer | |
| 7,915,777 B2 | 3/2011 | Vollmer | |
| 7,977,826 B2 | 7/2011 | Vollmer et al. | |
| 8,026,640 B2 | 9/2011 | Bott et al. | |
| 8,063,517 B2 | 11/2011 | Bott et al. | |
| 8,115,360 B2 | 2/2012 | Vollmer | |
| 8,134,273 B2 | 3/2012 | Vollmer et al. | |
| 8,227,951 B2 | 7/2012 | Grossmann et al. | |
| 8,283,815 B2 | 10/2012 | Vollmer | |
| 8,378,541 B2 | 2/2013 | Vollmer | |
| 8,441,158 B2 | 5/2013 | Vollmer | |
| 8,674,560 B2 | 3/2014 | Budde et al. | |
| 8,853,894 B2 | 10/2014 | Fick et al. | |
| 8,922,072 B2 | 12/2014 | Bott et al. | |
| 9,160,206 B2 | 10/2015 | Potoradi et al. | |
| 2004/0108789 A1 * | 6/2004 | Marshall | H02K 1/24 |
| | | | 310/216.016 |
| 2005/0073204 A1 | 4/2005 | Brooks | |
| 2005/0104467 A1 * | 5/2005 | Corengia | H02K 1/278 |
| | | | 310/156.28 |
| 2005/0116562 A1 * | 6/2005 | Schlosser | H02K 5/1672 |
| | | | 310/89 |
| 2006/0219880 A1 | 10/2006 | Braun et al. | |
| 2007/0040466 A1 | 2/2007 | Vollmer | |
| 2007/0114861 A1 | 5/2007 | Bott et al. | |
| 2007/0257566 A1 | 11/2007 | Vollmer | |
| 2007/0257575 A1 | 11/2007 | Vollmer | |
| 2008/0136277 A1 | 6/2008 | Esders | |
| 2008/0169718 A1 | 7/2008 | Schunk et al. | |
| 2008/0185931 A1 | 8/2008 | Platen et al. | |
| 2008/0289440 A1 | 11/2008 | Vollmer et al. | |
| 2008/0315704 A1 | 12/2008 | Vollmer | |
| 2009/0009114 A1 | 1/2009 | Schunk et al. | |
| 2009/0015080 A1 | 1/2009 | Vollmer et al. | |
| 2009/0152959 A1 | 6/2009 | Vollmer | |
| 2009/0160283 A1 | 6/2009 | Vollmer et al. | |
| 2009/0184602 A1 | 7/2009 | Braun et al. | |
| 2009/0251013 A1 | 10/2009 | Vollmer et al. | |
| 2009/0302832 A1 | 12/2009 | Budde et al. | |
| 2009/0315424 A1 | 12/2009 | Vollmer | |
| 2010/0000830 A1 | 1/2010 | Budde et al. | |
| 2010/0013330 A1 * | 1/2010 | Rodriguez Rodriguez | H02K 5/20 |
| | | | 310/54 |
| 2010/0013333 A1 | 1/2010 | Vollmer | |
| 2010/0019588 A1 | 1/2010 | Nonaka et al. | |
| 2010/0133940 A1 | 6/2010 | Grossmann et al. | |
| 2010/0264770 A1 | 10/2010 | Braun et al. | |
| 2012/0025654 A1 | 2/2012 | Bach et al. | |
| 2012/0025663 A1 | 2/2012 | Makino | |
| 2012/0205663 A1 | 8/2012 | Nakamura et al. | |
| 2013/0127264 A1 | 5/2013 | Fick et al. | |
| 2013/0147285 A1 | 6/2013 | Vollmer et al. | |
| 2013/0207505 A1 | 8/2013 | Kajiya | |
| 2013/0241324 A1 | 9/2013 | Mader et al. | |
| 2013/0241335 A1 | 9/2013 | Vollmer et al. | |
| 2014/0042857 A1 | 2/2014 | Mader et al. | |
| 2014/0070655 A1 | 3/2014 | Schneider et al. | |
| 2014/0097782 A1 | 4/2014 | Vollmer | |
| 2015/0035392 A1 | 2/2015 | Pal | |

FOREIGN PATENT DOCUMENTS

| | | |
|---|---|---|
| DE | 1763613 A1 | 9/1971 |
| DE | 102005002564 A1 | 8/2006 |
| DE | 102013002141 A1 | 8/2013 |
| DE | 102014001267 A1 | 8/2015 |
| DE | 102015016584 A1 | 8/2016 |
| EP | 0 314 607 A1 | 5/1989 |
| JP | S6416245 A | 1/1989 |
| JP | 2010035310 A | 2/2010 |
| WO | WO 2016051568 A1 | 4/2016 |

* cited by examiner

HOUSING UNIT FOR AN ELECTRIC MACHINE

CROSS-REFERENCES TO RELATED APPLICATIONS

This application claims the priority of European Patent Application, Serial No. 17160139.6, filed Mar. 9, 2017, pursuant to 35 U.S.C. 119(a)-(d), the disclosure of which is incorporated herein by reference in its entirety as if fully set forth herein.

BACKGROUND OF THE INVENTION

The present invention relates to a housing unit for an electric machine, in particular a PM (permanent magnet) servomotor.

The following discussion of related art is provided to assist the reader in understanding the advantages of the invention, and is not to be construed as an admission that this related art is prior art to this invention.

Housing units of this type are used for PM servomotors, for instance. With special applications, there is a requirement that the housing of the electric machine should or must be made of stainless steel. Stainless steel housings of this type have the negative characteristic that they exhibit a poor heat discharge, so that the permissible power of the electric machine, in most case the motor, has to be reduced accordingly or the motor has to be designed accordingly larger than comparable motors without stainless steel housings.

It would therefore be desirable and advantageous to provide an improved a thin-walled stainless steel housing for an electric machine to obviate prior art shortcomings in a cost-effective and simple manner.

SUMMARY OF THE INVENTION

According to one aspect of the present invention, a housing includes a first housing unit including a first bearing shield, a flange, a stator laminated core arranged between the first bearing shield and the flange, and a coating made of stainless steel and applied by an additive manufacturing method so as to cover the first bearing shield, the stator laminated core, and the flange and thereby form a unitary structure.

According to another aspect of the present invention, an electric machine including a first housing unit including a first bearing shield, a flange, a stator laminated core arranged between the first bearing shield and the flange, and a coating made of stainless steel and applied by an additive manufacturing method so as to cover the first bearing shield, the stator laminated core, and the flange and thereby form a unitary housing structure.

The present invention resolves prior art problems by manufacturing a housing or housing unit for the electric machine not completely from stainless steel, but merely to coat the outer housing layer with stainless steel. This stainless steel coating is carried out by means of an additive manufacturing method, for instance using the MPA (metal powder application) technique. To this end stainless steel particles in the metal adhesive bond are bonded, in effect welded, to the housing unit. Here the first bearing shield, the stator laminated core and the flange are provided with a shared stainless steel coating as the smallest unit for the housing. Therefore both the first bearing shield, generally the AS (drive-side) bearing shield, and similarly the flange can be made from raw material such as aluminum or ferrous metal, During manufacture, the stator lamination, which is also frequently referred to as the yoke package, is joined to the bearing shield and the flange in a first step and a stainless steel coating is then applied thinly, for instance approx. 1 to 3 mm. This results in a metallic adhesive bond with a low-thickness stainless steel layer, which has the same advantages as a complete stainless steel housing part, however, and at the same time ensures a significantly improved heat dissipation. On account of the stainless steel coating, sealing elements and screws for a material bond can be conserved; similarly with the thin-walled coating with stainless steel, this relatively expensive stainless steel material can be used sparingly which results in a cost saving.

According to another advantageous feature of the present invention, the coating includes stainless steel particles to establish a metal adhesive bond with the first bearing shield, the flange, and the stator laminated core. The coating in the additive manufacturing method also ensures a metallic adhesive bond even with highest bonding forces. Moreover, the additive manufacturing method gives rise to very high flexibility in respect of installation length and diameter for the housing unit or for the electric machine.

A suitable method for stainless steel-coating the housing unit involves an additive manufacturing method, e.g. what is known as the MPA (metal powder application) technique. Here the stainless steel coating of the housing unit is generated easily by stainless steel particles in the metal adhesive bond being bonded to the first bearing shield, the flange and the stator laminated core.

According to another advantageous feature of the present invention, the first housing unit can be configured to receive a rotor laminated core having magnets arranged thereon and interacting with a shaft made from stainless steel and supported in bearings. In this way a simple assembly of the housing unit to form a complete electric machine can be ensured, with the rotor laminated core embodied to interact with a rotor manufactured in particular from stainless steel.

According to another advantageous feature of the present invention, a second housing unit can be provided which includes a bearing shield and a coating made of stainless steel and applied by the additive manufacturing method so as to cover the bearing shield of the second housing unit, with the first housing unit being configured to connect to the second housing unit. Thus, a complete housing of a stainless steel-coated electric machine can be produced easily in that the housing unit is provided for coupling with a second bearing shield coated with a second stainless steel coating.

According to another advantageous feature of the present invention, at least one of the coating of the first housing unit and the coating of the second housing unit can have a region configured to include a cooling duct to establish a heat discharge, with the cooling duct being produced by the additive manufacturing method. In this way, the additive manufacturing method can be used to selectively provide the housing unit with in particular thin-walled and filigree cooling ducts for further improvement of the heat discharge.

In accordance with the present invention, a complete electric machine can be easily created in that the electric machine has a rotor unit comprised of a rotor, rotor laminated core, magnets and bearings.

A complete stainless steel housing for an electric machine is ensured in that the electric machine has a stainless steel housing formed from the housing unit and from the second bearing shield.

According to still another aspect of the present invention, a method for producing an electric machine includes joining in a first manufacturing step a first bearing shield, an outer laminated core, and a flange; and coating by using an additive manufacturing method the first bearing shield, the outer laminated core, and the flange with a coating made of stainless steel such that stainless steel particles in the coating form a metal adhesive bond with the first bearing shield, the flange, and the outer laminated core to establish a first unitary housing structure.

According to another advantageous feature of the present invention, a wound stator laminated core can be inserted in a third manufacturing step into the unitary housing structure.

According to another advantageous feature of the present invention, a rotor unit comprised of a shaft, bearings, a rotor laminated core and magnets can be inserted in a fourth manufacturing step into the housing structure to produce a motor unit.

According to another advantageous feature of the present invention, a second bearing shield can be fastened in a fifth manufacturing step to the motor unit so as to complete the production method for the electric machine.

The finished electric machine can be optimized smoothing the housing unit and/or the motor unit by a metal-cutting process and/or by an electropolishing method.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
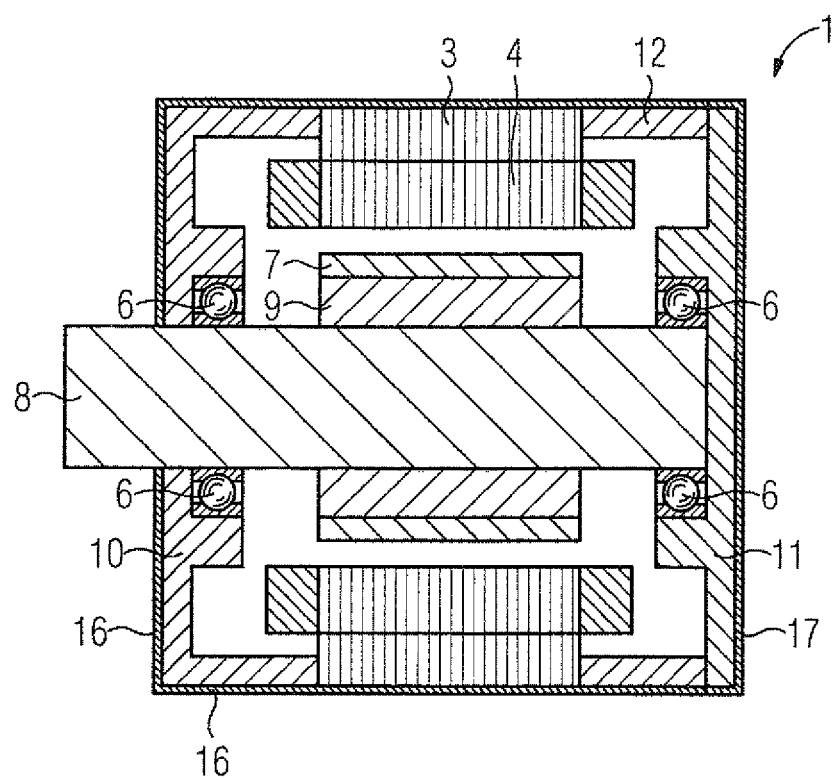
FIG. 1 shows a sectional view of an electric machine with a housing with a stainless steel coating in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of an electric machine, generally designated by reference numeral 1 and including a housing provided with stainless steel coatings 16, 17. The electric machine 1 essentially includes two housing units. The main housing unit, the production method for which is explained in detail in conjunction with FIGS. 2 to 4, essentially includes a first bearing shield 10, a stator laminated core 3 and a intermediate flange 12. This housing unit thus forms a stator unit having a shared stainless steel coating in the form of the first stainless steel coating 16. The second housing unit essentially includes a second bearing shield 11, which likewise has a second stainless steel coating 17. The special feature of the housing or electric machine 1 shown in FIG. 1 is that the entire housing has a stainless steel coating 16, 17, which is generated by means of an additive manufacturing method. These stainless steel coatings 16, 17 can be applied thinly, for instance with a thickness of 1 to 3 mm. As a result of the metallic adhesive bond between the stainless steel coating and the underlying aluminum or ferrous metal or the electrical sheet of the stator laminated core 3, heat dissipation of the housing and the electric machine 1 is significantly improved compared with a complete housing made from stainless steel. Furthermore, material can be saved by means of the thin-walled coating using stainless steel. The coating in the additive manufacturing method ensures a metallic adhesive bond with highest bonding forces.

The further components of the electric machine 1 shown in FIG. 1 are of essentially of a conventional type. For example, the electric machine 1 has a wound star-shaped laminated core 4. Furthermore, bearings 6 are provided for mounting the rotor unit 15 assigned to the shaft 8, the rotor laminated core and the magnets 7.

Figure 2:
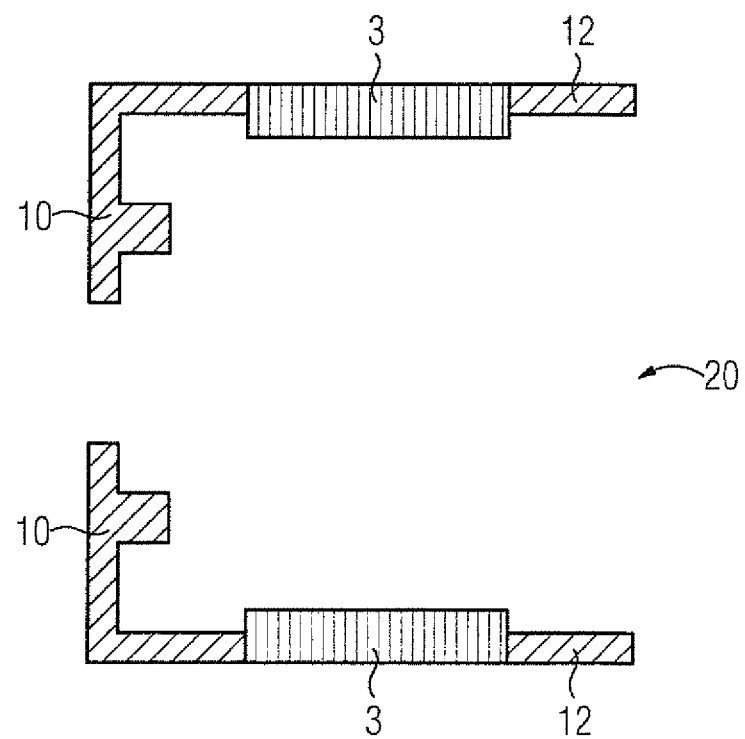
FIG. 2 shows a sectional view of basic components of the electric machine, as preparation for a housing unit of the electric machine.

FIG. 2 shows a section through basic components of the electric machine 1 shown in FIG. 1. These basic components involve a bearing shield 10, an intermediate flange 12, a stator laminated core 3 and a bearing shield. These are joined together in a first manufacturing step 20 in the manner shown in FIG. 2. Here the first bearing shield and the flange 12 generally are made of aluminum or ferrous metal, while the stator laminated core is composed of electrical sheet.

Figure 3:
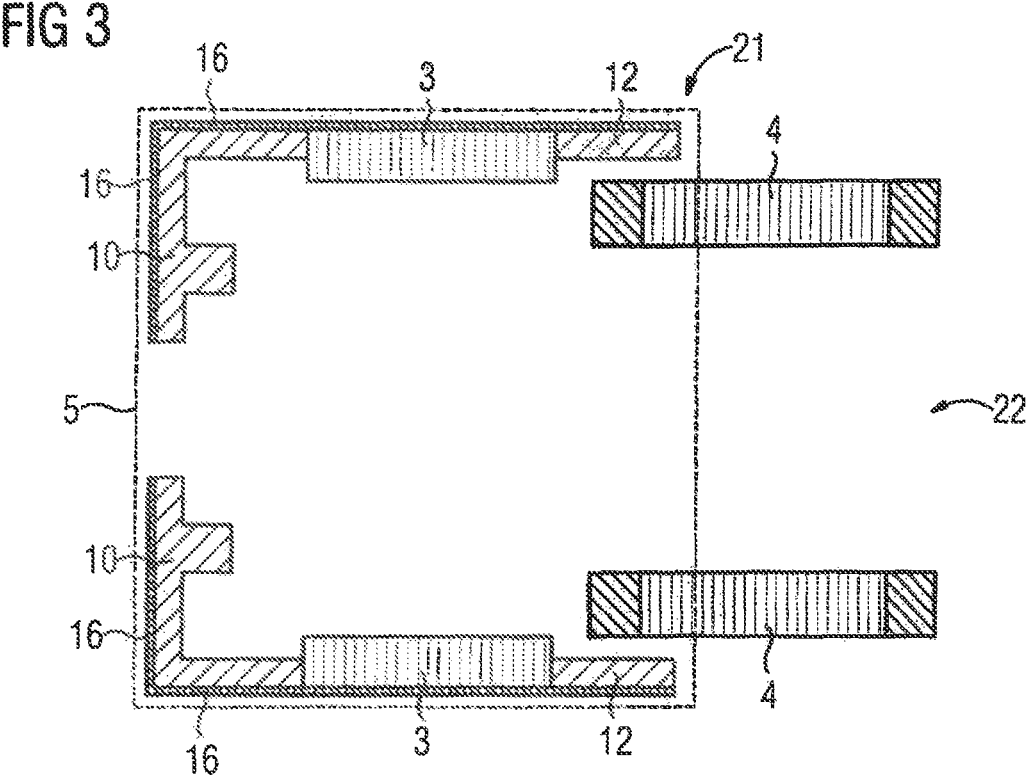
FIG. 3 shows a sectional view of a housing unit with stainless steel coating and a wound star-shaped laminated core.

FIG. 3 shows a section through a housing unit 5 with stainless steel coating 16 and a star-shaped laminated core 4 which, during a third manufacturing step 22, is inserted into the housing unit 5 of the star-shaped package. With the method according to the invention, the second manufacturing step 21 involves application of a shared stainless steel coating upon the basic components comprised of first bearing shield, flange and stator laminated core (yoke package) being joined together in the first manufacturing step.

Figure 4:
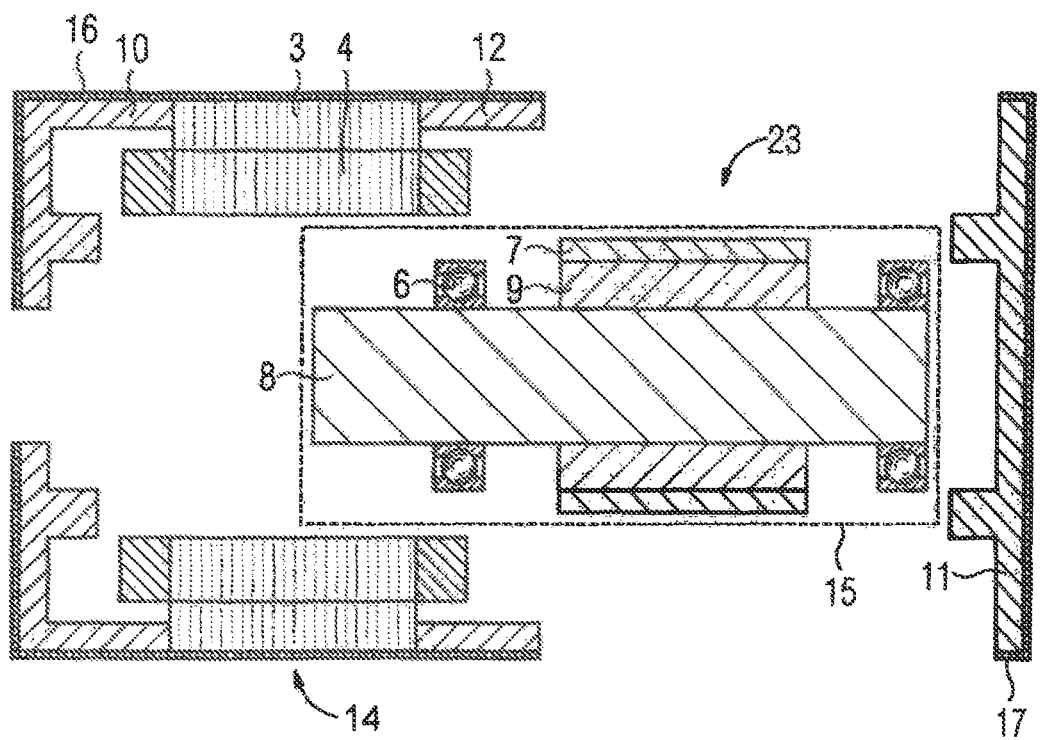
FIG. 4 shows an assembled housing unit as a stator unit and associated rotor unit.

FIG. 4 shows the stator unit 14 which is produced in the third manufacturing step 22 on the left side and which has both the stainless steel coating 16 and also the wound star-shaped package 4. The rotor unit 15 is shown on the right side of FIG. 4, which essentially includes the bearings 6, the shaft 8, the magnet 7 and the rotor laminated core 9.

Furthermore, FIG. 4 shows the second bearing shield 11, which has the stainless steel coating 17 as already shown in conjunction with FIG. 1.

FIG. 4 illustrates that, in a fourth manufacturing step 23, the rotor unit is introduced into the stator unit 14 and the motor or the electric machine 1 is completed accordingly by positioning the second bearing shield 11.

The advantages of the motor shown in FIGS. 1 to 4 are, in particular, the avoidance of axial connecting points, into which seals would otherwise have to be integrated. In addition, this improves axial heat conduction. Overall, standard components can be used, which are merely coated with stainless steel so that additional components and additional costs can be avoided. Force-fit joints are established by means of the additive process for stainless steel coating so that additional screwed connections can be dispensed with, for instance. Furthermore, additive manufacturing allows for a flexibility with respect to installation length and diameter without resulting in further tool costs. Storage costs for different housing dimensions are thus also avoided. Furthermore, on account of the stainless steel coating, the possibility to respond very flexibly to customer requirements and differing environmental conditions is created as a result of modifying the stainless steel.

In summary, the invention thus relates to a housing unit 5 for an electric machine 1, in particular for a PM servomotor, with a first bearing shield 10, with an intermediate flange 12 and with a first stator laminated core 3.

A thin-walled stainless steel housing of the electric machine can be easily and cost-effectively achieved in that the first bearing shield 10, the stator laminated core 3 and the flange 12 have a shared stainless steel coating 16, which is generated by means of an additive manufacturing method, wherein the housing unit 5 is formed from the first bearing shield 10, the stator laminated core 3, the flange 12 and the shared stainless steel coating 16.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A housing, comprising a first housing unit made of aluminum and/or iron metal and forming a unitary structure composed of a first bearing shield;
a flange;
a stator laminated core arranged between the first bearing shield and the flange; and
a common coating made of stainless steel particles which are applied by an additive manufacturing method and metal-adhesively bonded to the unitary structure over its entire outer surface so as to contiguously cover the first bearing shield, the stator laminated core, and the flange.

2. The housing of claim 1, wherein the first housing unit is configured to receive a rotor laminated core having magnets arranged thereon and interacting with a shaft made from stainless steel and supported in bearings.

3. The housing of claim 1, wherein the first housing unit is configured to receive a rotor unit which includes a shaft made from stainless steel, a laminated core having arranged thereon magnets and bearings for support of the shaft.

4. The housing of claim 1, further comprising a second housing unit, said second housing unit including a bearing shield and a coating made of stainless steel and applied by the additive manufacturing method and metal-adhesively bonded to the bearing shield so as to cover the bearing shield of the second housing unit, said first housing unit being configured to connect to the second housing unit.

5. The housing of claim 1, wherein the coating has a thickness in a range of 1 to 3 mm.

6. An electric machine, comprising a first housing unit made of aluminum and/or iron metal and forming a unitary structure composed of a first bearing shield, a flange, a stator laminated core arranged between the first bearing shield and the flange, and a common coating made of stainless steel particles which are applied by an additive manufacturing method and metal-adhesively bonded to the unitary structure over its entire outer surface so as to contiguously cover the first bearing shield, the stator laminated core, and the flange.

7. The electric machine of claim 6, constructed as a PM (permanent magnet) servomotor.

8. The electric machine of claim 6, further comprising a rotor unit including a rotor laminated core having magnets arranged thereon and interacting with a shaft made from stainless steel and supported in bearings, said first housing unit being configured to receive the rotor unit.

9. The electric machine of claim 6, further comprising a second housing unit, said second housing unit including a bearing shield and a coating made of stainless steel and applied by the additive manufacturing method and metal-adhesively bonded to the bearing shield so as to cover the bearing shield of the second housing unit, said first housing unit being configured to connect to the second housing unit.

10. A method for producing an electric machine, comprising:
joining in a first manufacturing step a first bearing shield, an outer laminated core, and a flange to form a first housing unit made of aluminum and/or iron metal; and
coating by using an additive manufacturing method the first bearing shield, the outer laminated core, and the flange with a common coating made of stainless steel particles such that the stainless steel particles in the coating form a metal adhesive bond with and contiguously cover an entire outer surface of the first bearing shield, the flange, and the outer laminated core to establish a first unitary housing structure.

11. The method of claim 10, further comprising Inserting a wound stator laminated core into the unitary housing structure.

12. The method of claim 11, further comprising inserting a rotor unit comprised of a shaft, bearings, a rotor laminated core and magnets into the housing structure to produce a motor unit.

13. The method of claim 12, further comprising fastening a second bearing shield to the motor unit.

14. The method of claim 12, further comprising smoothing the housing unit and/or the motor unit by a metal cutting process and/or by an electropolishing method.

15. The method of claim 10, further comprising:
applying a coating made of stainless steel by the additive manufacturing method and metal-adhesively bonding upon a second bearing shield such as to cover the second bearing shield and thereby form a second housing structure;
and connecting the first housing structure to the second housing unit structure.

16. The method of claim 15, further comprising forming by the additive manufacturing method a cooling duct for heat discharge in the housing structure in a region of the stainless steel coating of the first housing structure and/or the stainless steel coating of the second housing structure.

* * * * *